R. POCHON.
DIRIGIBLE HEADLIGHT.
APPLICATION FILED JUNE 27, 1917.
1,255,048.
Patented Jan. 29, 1918.
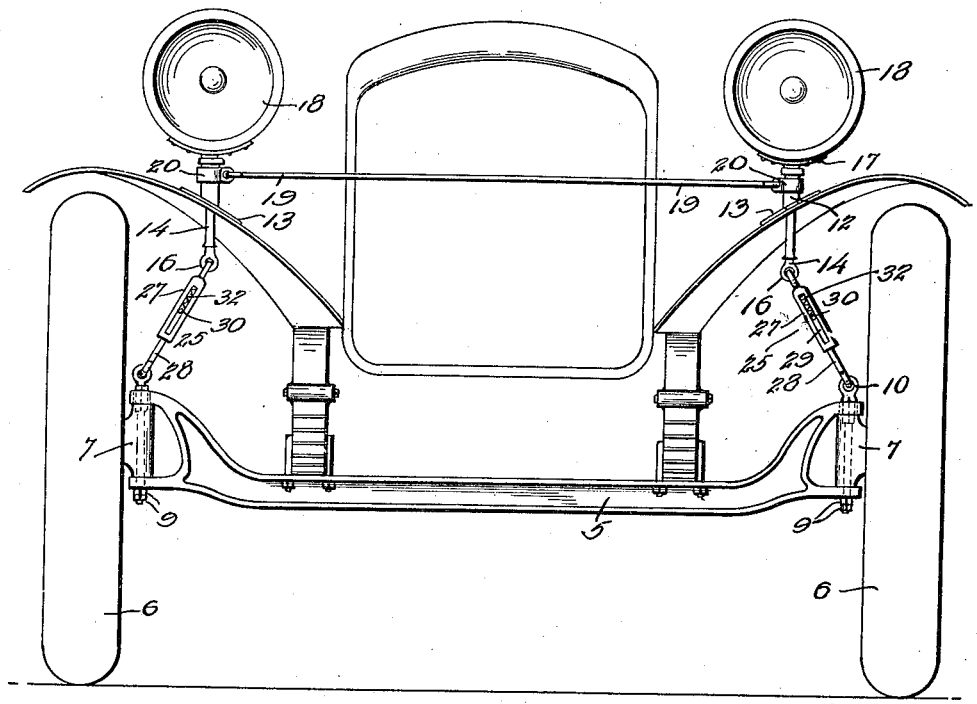
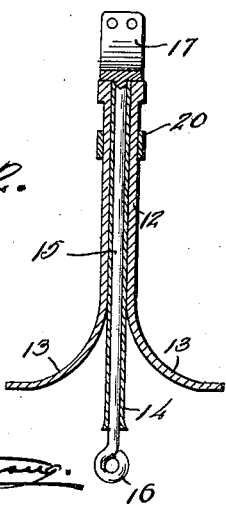
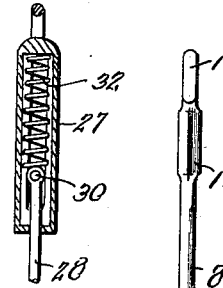
WITNESSES
INVENTOR
Roger Pochon
BY
ATTORNEY

UNITED STATES PATENT OFFICE.

ROGER POCHON, OF GRAYSON, NEBRASKA.

DIRIGIBLE HEADLIGHT.

1,255,048.    Specification of Letters Patent.    Patented Jan. 29, 1918.

Application filed June 27, 1917. Serial No. 177,328.

*To all whom it may concern:*

Be it known that I, ROGER POCHON, a citizen of the United States, residing at Grayson, in the county of Sheridan and State of Nebraska, have invented certain new and useful Improvements in Dirigible Headlights, of which the following is a specification.

This invention relates to automobile lamp mechanisms, the object in view being to provide simple and effective means capable of ready and easy attachment to the standard automobile now in use, whereby in the operation of the steering wheel of the machine, the lamps are correspondingly turned in such manner that the rays of light projected from the lamps are directed forward in lines parallel to the path of movement of said steering wheels of the machine, with the result that the roadway is fully illuminated in the direct path which the machine is caused to travel by reason of the angle at which the steering wheels are set.

With this object in view, together with others which will appear as the description proceeds, the invention resides in the novel formation, combination and arrangement of parts all as will be described more fully hereinafter, illustrated in the drawing and particularly pointed out in the claim.

In the drawing:

Figure 1 is a front elevation of a conventional form of automobile, and illustrating the application of a dirigible lamp mechanism constructed in accordance with the invention, Fig. 2 is an enlarged sectional view taken longitudinally through the lamp supporting means, Fig. 3 is a similar view taken through the longitudinally adjustable link connecting the steering knuckle and lamp post, and Fig. 4 is an elevation of the pin used in connecting the steering wheel of the vehicle to the axle thereof.

Referring now particularly to the drawing, 5 indicates the stationary front axle of the automobile, and 6 the steering wheels carried thereby, the said wheels being rotatably mounted upon suitable spindles 7, rotatably mounted at their inner ends between the yoked ends of the axle 5. A pin 8 connects the yoked end of the axle with the vertically disposed barrel of the spindle 7, this construction providing the steering knuckle familiar to this type of vehicles.

The pin 8 extends at its lower end below the underside of the axle 5, and is provided with lock nuts 9, while the upper end of the pin projects above the upper surface of the axle and is formed with an eye 10. The pin 8 is also provided with a squared portion 11, the said squared portion fitting within a similarly shaped bore, socket or recess in the upper end of the knuckle 7, whereby the said spindle when rotating about its vertical axis will rotate the stem 8.

The lamps which are used in carrying out the invention are mounted upon the vehicle so as to rotate about a vertical axis, and in the present instance, these lamps are supported upon the fenders or forward mud guards of the automobile. Upon each of the mud guards is secured a vertically disposed socket 12, the said sockets being formed of relatively short tubular members, having outwardly extending arms 13 at their lower ends, the said arms affording means whereby the lower ends of the said sockets may be fastened to the mud guard. Each socket is equipped with a sleeve 14, the said sleeves being rotatably supported within the sockets and extending at their lower ends downwardly to the under surface of the mud guards. A post 15 is rotatably supported in each sleeve 14, and each post is provided at its lower end with an eye 16, while the upper end of each post is provided with a plate 17, upon which the head light 18 rests. Any approved means may be employed for securing the headlights to the plates 17.

To hold the vertically disposed socket 12 in proper upright position and to prevent the said socket becoming deranged, a stay 19 is provided, the said stay constituting a rod disposed laterally across the front of the automobile, and being secured at its ends in suitable clips 20 affixed to the lamp supporting sockets.

The rotary movement developed in the connecting pin 8 of the steering knuckle when the spindles are oscillated upon their vertical axes, is to be used to rotate the lamp posts in their sockets 12. The means employed in the present instance for transmitting this rotary movement from the stem 8 to the posts 15 is a link indicated generally at 25, the said link being provided at its opposite ends with eyes 26 engaging the eyes 10 and 16 in the pin 8 and lamp posts 15, respectively. It is obvious, therefore, that rotary movements of the pin 8 will cause the link 25 to twist, whereupon the lamp posts 15 will be rotated in the same direction and in equal degree with the pin 8.

To compensate for the vertical vibrations of the axle and similar movements of the body of the vehicle when the latter is traveling over rough ground, the link 25 is made telescopic, the socket portion thereof being indicated at 27, and the stem portion being indicated at 28. The socket is provided with an elongated longitudinally disposed slot 29, through which projects a lug or screw 30, affixed to the inner end of the rod 28. This construction permits of the sections of the link moving longitudinally, but independent rotation of either of the sections is prevented. To hold the telescopic member with the sections thereof at the limits of their outer movements, a spring 32 is arranged within the socket member 27, one end of the spring exerting pressure against the inner end of the rod 28. From this construction it is apparent that the link 25 is capable of lengthening or shortening as required when the vehicle strikes uneven places in the roadway, while rotations of the pin 8 will thereupon be transmitted to the lamp supporting posts 15.

From the foregoing it is apparent that I have provided an extremely simple and thoroughly efficient dirigible head light mechanism, and one in which the operations are at all times positive. By the particular arrangement that I have shown, the turning of the steering wheels in any direction will cause the lamp 18 to correspondingly turn, whereupon the light rays projected from the lamp will be directed in the path of travel to be assumed by the driver of the vehicle.

While the present is a disclosure of the preferred embodiment of the invention, it is to be understood that the invention is not limited thereto, but that various changes in the minor details of construction, proportion, and arrangement of parts may be resorted to if desired without departing from the spirit of the invention as defined by the appended claim.

What is claimed is:

The combination with a vehicle and the steering knuckle therefor; a pin connecting the parts of said knuckle, a shouldered portion on said pin, the rotatable part of said knuckle being provided with the shouldered recess for the accommodation of the shouldered portion of said pin, an eye on the upper end of said pin, a lamp socket having its vertically disposed bore mounted above said pin, a lamp post rotatably mounted in said socket and projecting at one end below the latter, a telescopic link connecting the lower end of said post and said eye, and a spring in said link for holding the latter extended.

In testimony whereof I affix my signature in presence of two witnesses.

ROGER POCHON.

Witnesses:
AMI F. SANDOZ,
FRED BEGUIN.